Aug. 21, 1956　　　A. B. ROOT 3RD　　　2,759,985
PROCESS AND APPARATUS FOR PRODUCING MONOVINYL ACETYLENE
Filed July 17, 1953　　　　　　　　　　　　2 Sheets-Sheet 1
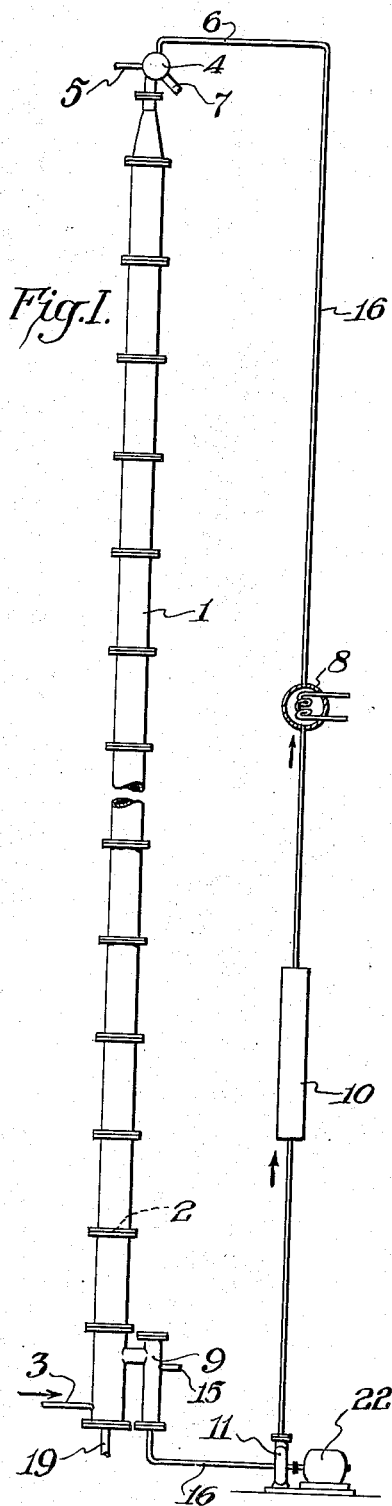
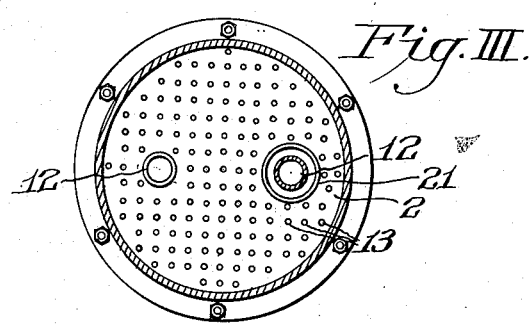
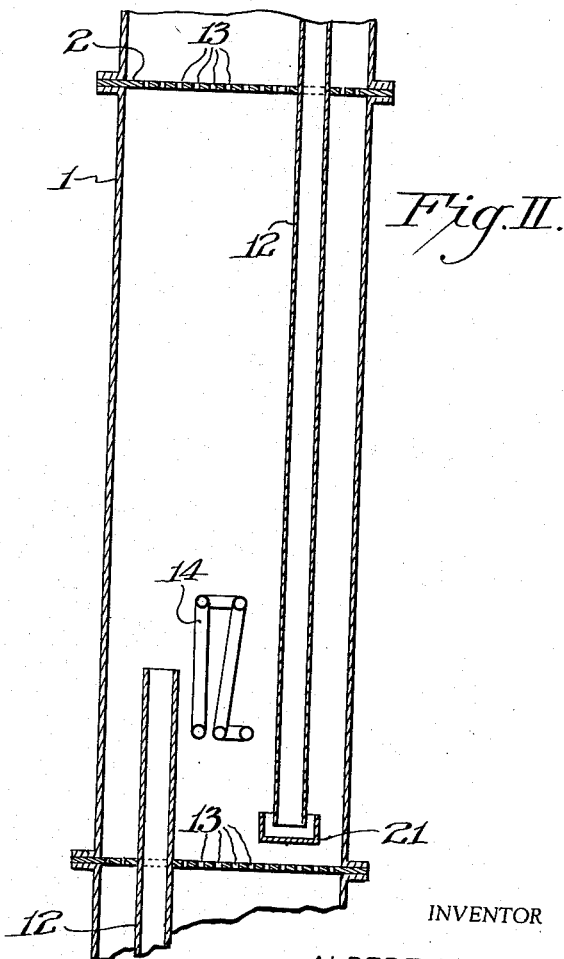
INVENTOR
ALBERT B. ROOT
BY Frank C. Hilberg
ATTORNEY Aug. 21, 1956     A. B. ROOT 3RD     2,759,985
PROCESS AND APPARATUS FOR PRODUCING MONOVINYL ACETYLENE
Filed July 17, 1953     2 Sheets—Sheet 2
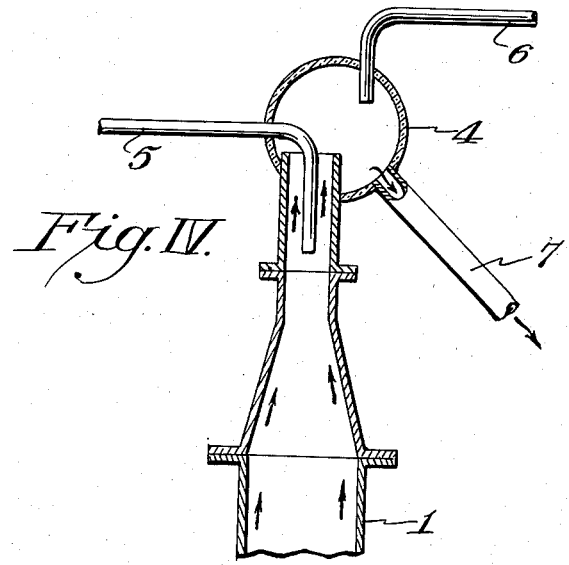
Fig. IV.
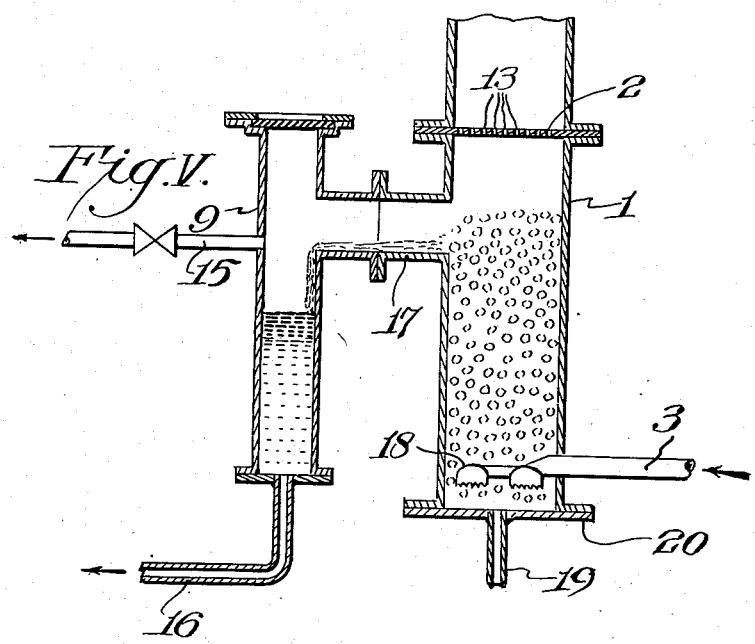
Fig. V.
INVENTOR
ALBERT B. ROOT
BY Frank C. Hilberg
ATTORNEY

United States Patent Office 2,759,985
Patented Aug. 21, 1956

2,759,985
PROCESS AND APPARATUS FOR PRODUCING MONOVINYL ACETYLENE

Albert B. Root 3rd, Louisville, Ky., assignor to E. I. du Pont de Nemours and Company, Wilmington, Del., a corporation of Delaware Application July 17, 1953, Serial No. 368,714

7 Claims. (Cl. 260—678)

This invention relates to an apparatus for carrying out gas-liquid contact reactions, and more particularly to controlling polymerization of acetylene to monovinyl acetylene and to an improved apparatus and method for polymerizing acetylene to monovinyl acetylene in the presence of an aqueous solution of cuprous chloride as a catalyst.

Monovinyl acetylene is an intermediate used to a large extent in the production of chloroprene and neoprene. It is normally manufactured by bringing acetylene into close contact with cuprous chloride dissolved in a concentrated aqueous solution of ammonium chloride or potassium chloride. One difficulty with this preparation of monovinyl acetylene is that there is a tendency for the polymerization to proceed to formation of divinyl acetylene and higher polymers. In order to suppress or eliminate this higher polymerization the monovinyl acetylene is removed from the catalyst as soon as practical after it is formed, thereby keeping the conversion of acetylene to divinyl acetylene very low.

A method of this kind is described in U. S. Patent No. 2,048,838, in which the monovinyl acetylene is separated from the gas flowing from the catalyst chamber by cooling and the acetylene recycled. In this method, of the approximately 10% conversion per pass, about 80% of the acetylene goes to monovinyl acetylene and the remaining 20% represents to a large extent the formation of undesirable compounds which, at present, have little commercial value.

Another difficulty with such prior art methods is that considerable mechanical control is necessary to agitate the catalyst adequately and, in most cases, the equipment is bulky, expensive and requires considerable supervision, power and maintenance.

The object of this invention is the provision of an apparatus having wide utility in gas-liquid contact processes. Another object is the provision of an apparatus which is relatively simple, economical and requires little maintenance and supervision. Another object of this invention is to prepare monovinyl acetylene from acetylene with good conversion and a minimum of undesirable by-products. A still further object is the provision of a method which may be operated continuously with unreacted acetylene being recycled so that the yield of monovinyl acetylene, based on the total acetylene consumed, is relatively high. Other objects will appear as the description of the invention proceeds.

These and other related objects are accomplished by an improved apparatus consisting essentially of a vertical column provided with at least two but preferably, when used for making monovinyl acetylene, less than 15 separated intercommunicating reaction zones. The apparatus is operated so that the conversion in the case of acetylene to monovinyl acetylene in each pass through the column is between 2% and 25%. For some processes more than 15 zones may be used.

The invention will be more fully understood by reference to one embodiment as shown in the drawing and the example. In the drawing, Figure I is a diagrammatic view of the reaction column. Figure II is a detailed diagrammatic side view of a section of the column representing one zone in the reaction column. Figure III is a diagrammatic top view of one of the plates forming a partition between the zones mentioned above. Figure IV is also a diagrammatic detailed view illustrating the section of the top of the column in one of its modifications. Figure V is a detailed side diagrammatic section of the base of the tower showing a side arm for the collection and removal of tar or other deposits.

In all the figures the reference numerals refer to the same parts, of which 1 indicates the main column which is divided into several intercommunicating zones (preferably less than 15 but more than 2) by plates 2 having perforations which make up from 2% to 6%, preferably 3%, of the entire plate area. The vertical distance between the plates is usually from about 8" to 48", preferably 36". During gas flow catalyst depth is preferably 80% to 100% of the distance up to above plate. Without flow the catalyst occupies about 40% to 60% of free reactor volume.

The column is also provided with a bottom 20, drain 19, an inlet 3 at the bottom of the column for introducing acetylene or other gaseous reactant and an inlet 6 at the top for introducing the circulated catalyst solution. The entering acetylene is maintained at a pressure of between 10 and 100 lbs. per square inch (gauge).

In one form of the apparatus the top of the column is provided with a horizontally disposed cylindrical chamber 4 having glass ends which serve as sight glasses so that the formation of solid material can be observed and remedied. This cylindrical portion is connected securely in a gas-tight manner to the column 1. It is also provided with spray inlets 5 and 6 for washing the upper walls. Inlet 5 enters through the cylindrical chamber 4 to the top of the column with sprays arranged to wet the column walls above the catalyst level. The circulating catalyst inlet 6 is provided with a spray for washing the rest of the chamber wall and the outlet 7 through which the reaction gases pass.

One form of perforated plate 2 in the reactor column is shown in detail in Figure III. The holes 13 are usually about 1/8" in diameter on 5/8" centers distributed in the plate and represent from 2% to 6%, preferably about 3%, of the plate area. Each reaction zone between the plates is provided with a downcomer 12 which in the example is about 1" outside diameter. Normally the diameter of this pipe should be about one-twelfth that of the column 1. It may be attached by brazing or other means to the reactor plate and extends downwardly to within a few inches of the next lower perforated plate. The bottom of the downcomer 12 is preferably provided with a seal pot 21 or other device to prevent gas bubbles from entering it. The downcomer 12 may extend upwardly through the plate 2 into the adjacent reaction zone up to about 80% of the distance between the perforated plates, preferably about 25% of the distance. This extension may be varied in length, but as it is shortened or eliminated a restriction must be used in the downcomer so that an efficient volume of catalyst will be maintained on each plate.

In the conversion of acetylene to monovinyl acetylene, a tarry residue often accumulates, and this is removed by a tar separator 9 shown in detail in Figure V. This separator is connected to the lower reaction chamber of colume 1 through side arm 17. The tar which accumulates at the bottom of the reactor column overflows through side outlet 17 into the side arm shown in Figure V as 9, and is drawn off through pipe 15. The tar collector is also provided with a pipe 16 at its bottom for circulating catalyst to the top of the column 1.

Column 1 is provided with a drain 19 at its bottom, and the inlet 3 is connected to a rose or other bubbling device 18. The pipe 16 leading from the tar collector or, if the collector is not used in some reactions, 16 connects with pipe 19, and is then connected to a pump 11 driven by motor 22 for pumping the catalyst upwardly to the top of the reactor. A catalyst reducer 10 consisting essentially of copper scrap may be inserted in the line 16 for reducing the copper chloride catalyst. Each chamber is provided with a cooling coil 14 as shown in Figure II. A cooler 8 is also inserted in line 16, giving additional catalyst temperature control.

The operation of the apparatus will be illustrated as a converter for the catalytic conversion of acetylene to monovinyl acetylene, but it is to be understood that a great many different reactions may be carried out where a gas is polymerized in the presence of a liquid catalyst or where any gas-liquid contact reaction takes place. It is also to be understood that the gas may be the catalyst and the liquid the reactant.

In a specific embodiment of the invention, acetylene, preferably with a small amount of HCl gas, is introduced through pipe 3 and rose 18, and passes upwardly through column 1 in the form of bubbles. This HCl is added to maintain about 0.4% to 0.5% acid in the catalyst. The liquid catalyst is introduced at the top of the column and passes downwardly from plate to plate through the downcomers so that as the acetylene rises it comes in contact with the catalyst at each zone, and some is converted to monovinyl acetylene. The equipment is designed to operate so that only from 2% to 25% conversion takes place at each pass through the reactor. In a preferred embodiment for preparing monovinyl acetylene on a pilot plant scale, the column 1 is about 8″ in diameter and about 22 feet high divided into ten chambers by the perforated plates spaced about 2 feet apart. The perforated plates have ⅛″ holes on ⅝″ centers over part of their area to give a free area of 2.82%. Acetylene is supplied at the bottom of the column at about 30 pounds per square inch and at the rate of 150 to 500 pounds per hour, giving an $F_s$ value between 10 and 33, where $F_s$ equals the velocity through the perforations multiplied by the square root of gas density, when the velocity is in feet per second and the density is in pounds per cubic foot. This range of $F_s$ values is preferred in installations of all sizes.

The column is made of copper and is maintained at a temperature of about 65° to 75° C. Catalyst circulation is preferably kept down to that needed for its treatment to remove tar and control catalyst composition. The size of external pipes and treating equipment is kept to a minimum, such that hold-up is less than about one minute. The catalyst contains about 31.5% of cuprous chloride, 25% of potassium chloride, 0.4% to 0.5% of hydrochloric acid and 38% to 43% of water. With a feed of 223 pounds of acetylene per hour and a catalyst circulation of one gallon per minute, the conversion of acetylene to monovinyl acetylene is about 10% per pass, and the over-all yield is about 88%.

During the operation time 10% hydrochloric acid is intermittently sprayed at the top of the reactor through pipes 5 and 6 to flush down the top walls of the column, and part of the system in which the effluent gas is treated to separate the monovinyl acetylene. The sight glass ends of cylindrical chamber 4 enable the operator to observe when catalyst is entrained or deposited on the walls with the danger of formation of explosive cuprous acetylide. The acid lines provide for washing down any solid deposits and also to maintain the proper acid concentration in the catalyst. The catalyst descends ultimately to the bottom of the reaction chamber through the tar separator and is circulated through pipe 16 and, when necessary, through the catalyst reducer 10, temperature control 8, and finally back to the top of the tower. The reducer and temperature controls are not always necessary and normally one or both are by-passed. The monovinyl acetylene is drawn off at 7 at the top of the tower.

The present invention offers many advantages over conventional sieve plate columns used in fractional distillation. For example, the depth of the liquid on the plates must be much greater in this invention than in distillation practice. In order to prevent excessive leakage of liquid through the plates the area of the holes must be greatly reduced and the liquid level controlled by constrictions in the downcomer. Another advantage of the present invention is that the conversion to monovinyl acetylene is high and the formation of by-products such as divinyl acetylene is practically negligible.

It will be apparent that many widely different embodiments of this invention may be made without departing from the spirit and scope thereof, and therefore it is not intended to be limited except as indicated in the appended claims.

I claim:

1. The process of preparing monovinyl acetylene from acetylene which comprises passing humidified acetylene upwardly through a series of from 2 to 15 communicating reaction zones separated by perforated plates, the perforations representing from 2% to 6% of the entire area of the plate, maintaining a pressure of between 10 and 100 pounds per square inch (gauge) on the acetylene being fed into the bottom of the reactor, maintaining the temperature of the column at about 60° to 75° C., passing an aqueous acidified solution of cuprous chloride as a catalyst downwardly through the reaction column and maintaining a body of catalyst solution above each of the said perforated plates to the extent of about 80% to 100% of the distance between each plate and the next above it, recycling the catalyst solution from the bottom of the column to the top of the column, and collecting the gaseous monovinyl acetylene continuously as it rises to the top of the column.

2. The process of claim 1 in which the body of catalyst solution occupies nearly the entire volume of each reaction zone as the acetylene bubbles through it.

3. The process of claim 1 in which the entering acetylene contains HCl gas.

4. The process of claim 1 in which the gas is passed through the perforated plates at a rate such that the product of the velocity of the gas in ft. per sec. and the sq. root of the density of the gas is between 10 and 33.

5. An apparatus for carrying out chemical reactions of the gas-liquid contact type which comprises a vertical column having a plurality of reaction zones therein separated by perforated plates the perforations thereof representing from 2% to 6% of the area of the plate, means for passing the gaseous reactant into the bottom of the column, means for passing the liquid phase downwardly from the top of the column, means for circulating the liquid which collects at the bottom of the column back to the top of the column, each of the reaction zones between the said perforated plates being provided with a downcomer which extends from near the bottom of each of the reaction zones into the next zone above it, whereby the liquid phase fills from 80% to 100% of the volume between the plates, said zones between the perforated plates being provided with a cooling means, and means for withdrawing the reaction product at the top of the column.

6. The apparatus of claim 5 in which the means for circulating the liquid catalyst contains a temperature control.

7. The apparatus of claim 5 in which the means for circulating the liquid catalyst contains a chamber filled with copper turnings as a reducing agent.

References Cited in the file of this patent

UNITED STATES PATENTS

| | | |
|---|---|---|
| 2,162,373 | Carter et al. | June 13, 1939 |
| 2,191,068 | Carter et al. | Feb. 20, 1940 |
| 2,371,477 | Souders et al. | Mar. 13, 1945 |
| 2,429,126 | Given | Oct. 14, 1947 |